United States Patent [19]

Palm

[11] Patent Number: 4,688,975
[45] Date of Patent: * Aug. 25, 1987

[54] QUICK CHANGE TOOL RETAINER

[75] Inventor: Bernhard Palm, Brookfield, Wis.

[73] Assignee: Milwaukee Electric Tool Corporation, Brookfield, Wis.

[*] Notice: The portion of the term of this patent subsequent to Dec. 2, 2003 has been disclaimed.

[21] Appl. No.: 868,719

[22] Filed: May 30, 1986

Related U.S. Application Data

[62] Division of Ser. No. 720,859, Apr. 8, 1985, Pat. No. 4,626,152.

[51] Int. Cl.⁴ .................. B23B 31/22; B23B 45/14
[52] U.S. Cl. .................... 409/232; 279/1 B; 279/75; 408/136; 408/239 R; 408/712
[58] Field of Search ............. 408/239 R, 204, 712, 408/205, 206, 207, 208, 209, 136; 279/1 B, 9 R, 20, 22, 66, 67, 68, 69, 70, 71, 72, 73, 74, 75, 76, 78, 80; 409/231, 232, 234

[56] References Cited

U.S. PATENT DOCUMENTS

| | | | |
|---|---|---|---|
| 2,441,414 | 5/1948 | Hohwart et al. | 408/129 |
| 2,813,280 | 11/1957 | Huffman | 408/36 X |
| 3,373,658 | 3/1968 | Larsen | 409/231 |
| 3,658,351 | 4/1972 | Bensamin et al. | 279/1 B |
| 3,765,787 | 10/1973 | Hart et al. | 409/231 X |
| 4,582,456 | 4/1986 | Imai | 408/136 |

Primary Examiner—Gil Weidenfeld
Assistant Examiner—Glenn L. Webb
Attorney, Agent, or Firm—Bayard H. Michael

[57] ABSTRACT

The power tool has a magnetic base with superposed permanent magnet assemblies. The upper assembly can be moved relative to the lower assembly to subtract from or reinforce the magnetic field. When the sensing probe is pushed into the base the electric motor can be switched on to rotate a spindle on which a rotary cutting tool is axially mounted. The tool feed is controlled by a handle which can be mounted on either side of the tool housing. A coolant reservoir on the base has a hose connected to a pump which is connected to a manifold supplying coolant to the center of the cutting tool. The cutting tool is biased upwardly and pinches off the coolant when the tool is raised from the work. The tubular tool shank is retained on the drive spindle by balls carried by a cage and moved into engagement with a groove in the tool shank by a cam surface on a release collar spring biased to move the balls to engage the tool.

1 Claim, 17 Drawing Figures

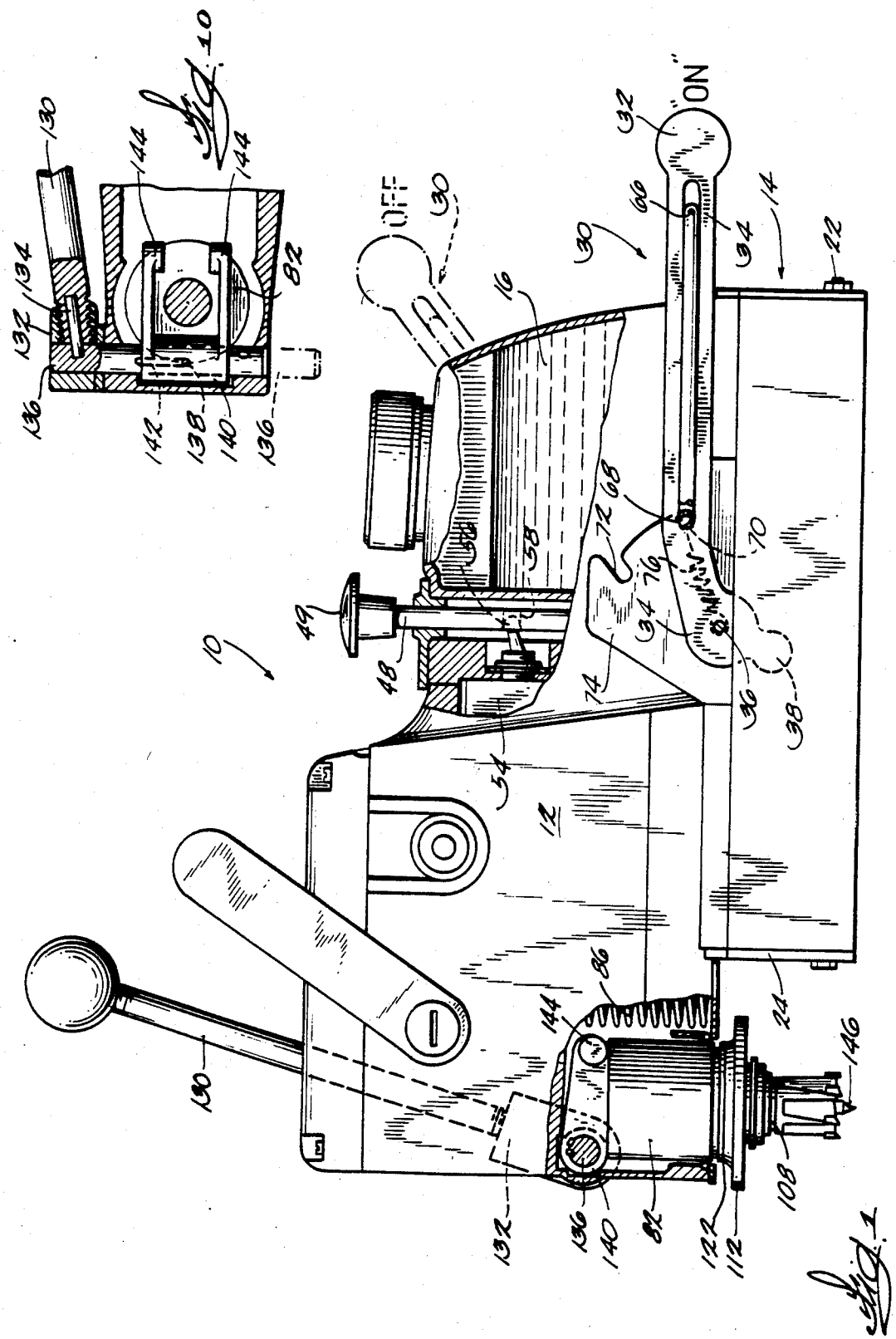

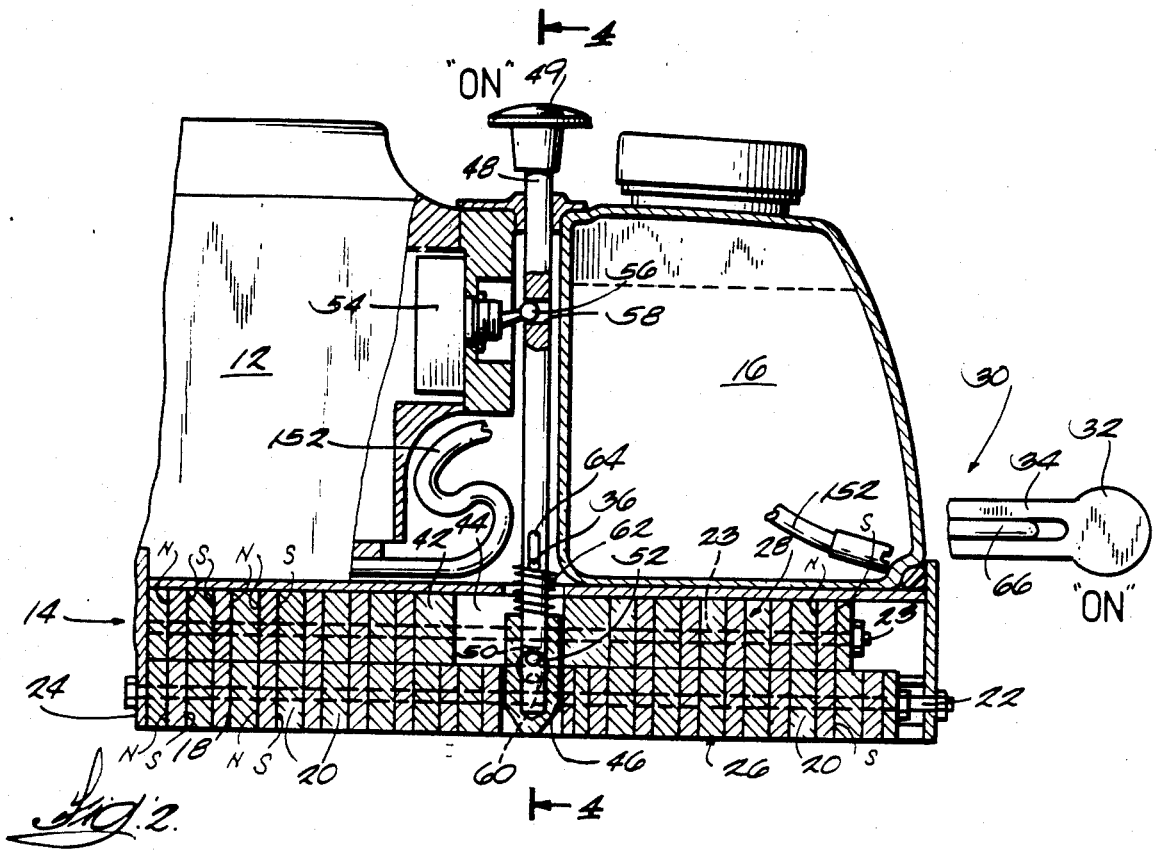
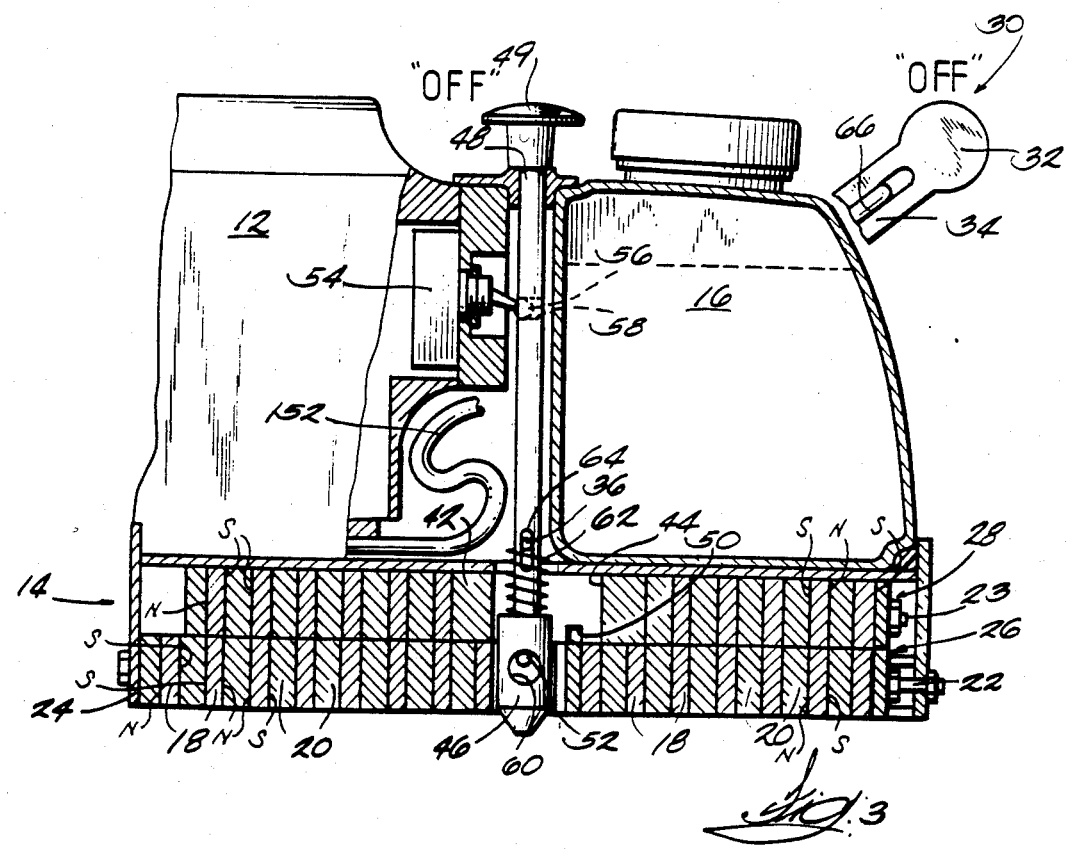

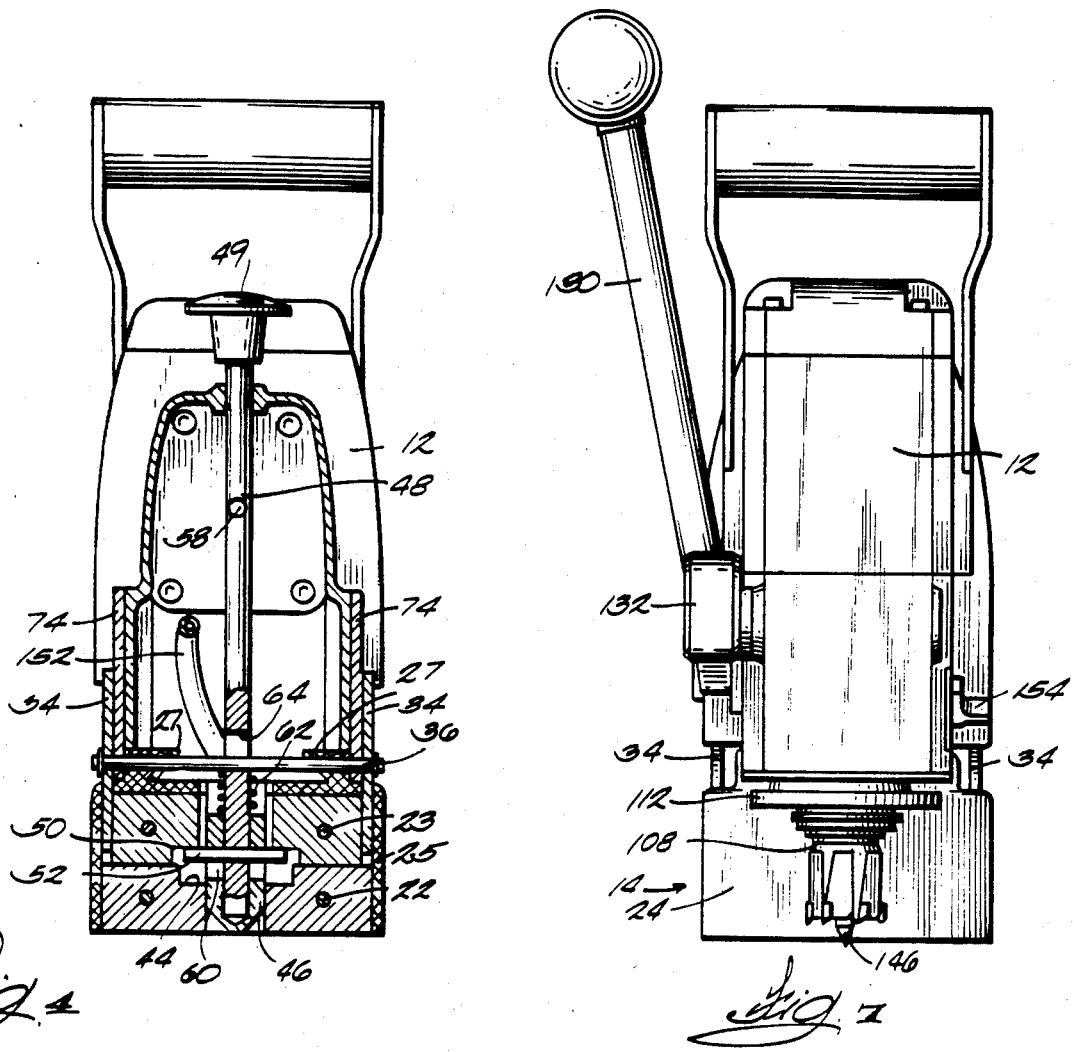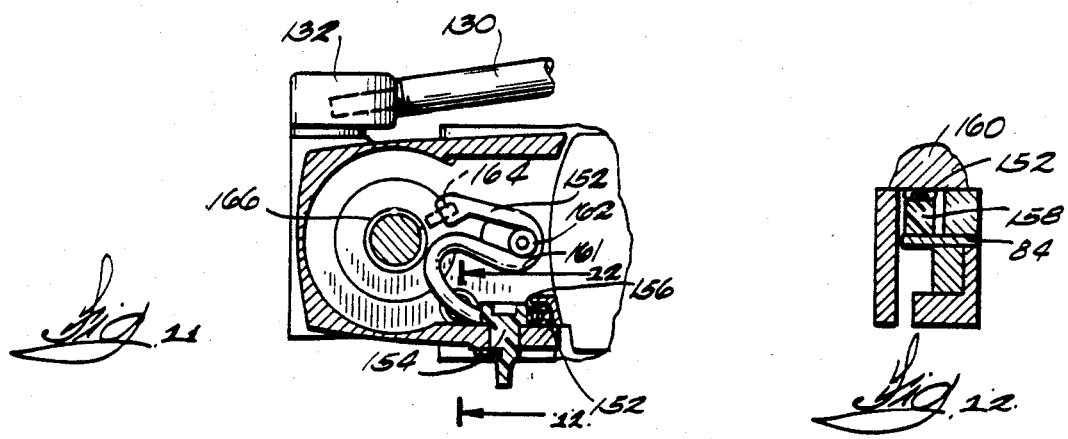

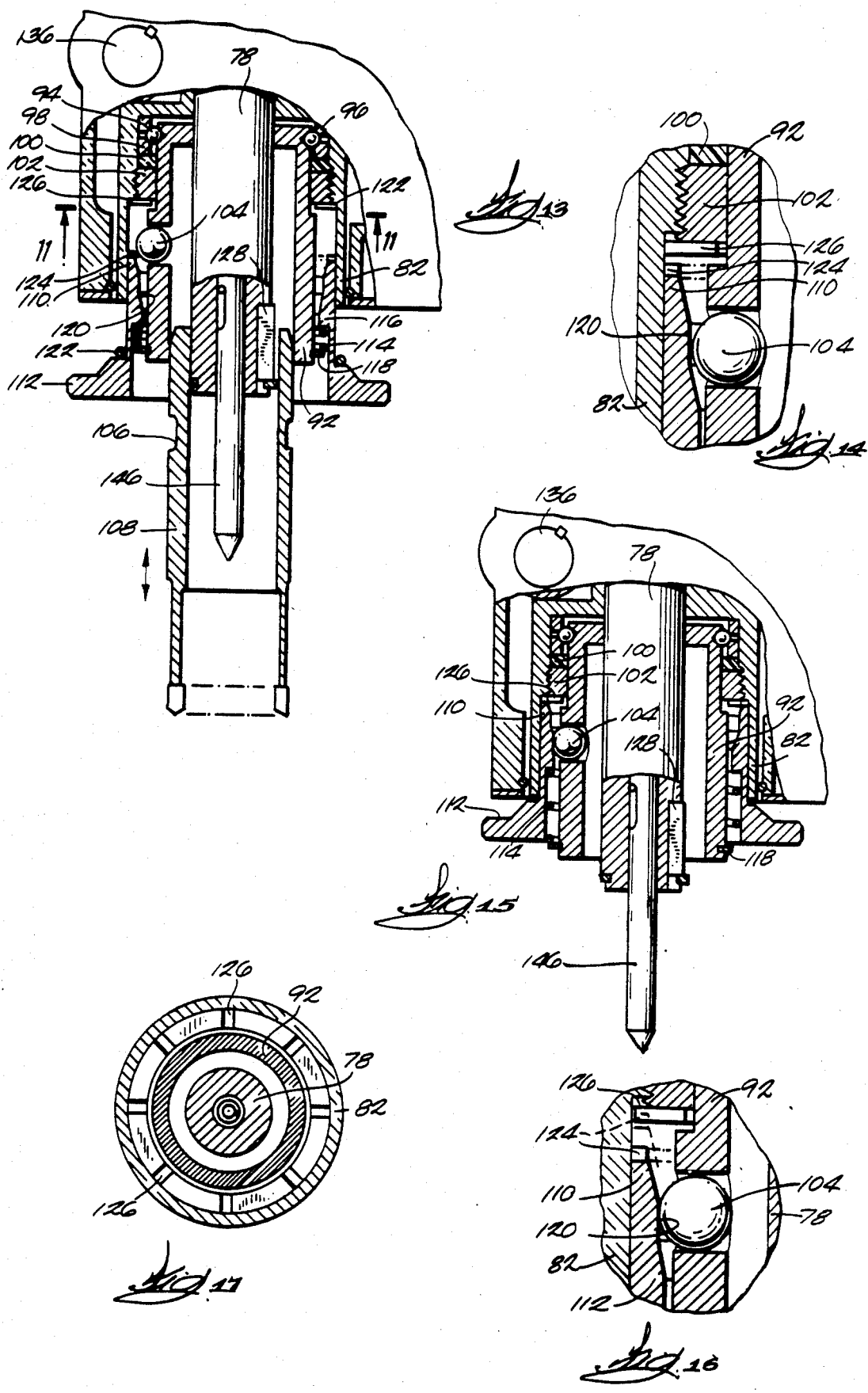

QUICK CHANGE TOOL RETAINER

This application is a division of application Ser. No. 720,859, filed 4/8/85, now U.S. Pat. No. 4,626,152.

BACKGROUND OF THE INVENTION

This invention relates to a tool retainer for holding a tool having a tubular shank on a drive spindle to be driven by the spindle and moved axially on the spindle under control of a cage and an associated tool feed arrangement. The structure must allow quick tool changes.

SUMMARY OF THE INVENTION

This invention provides a quick change tool retainer for a portable tool having a drive spindle axial fixed in the frame. The power tool has an axially movable tool feed collar on the spindle. A bearing supports a cage inside the collar and the tubular shank of a cutting tool fits between the spindle and the cage to be driven by a key. The cage has a plurality of radial holes with a ball in each hole to be moved radially inward to engage a groove on the tool shank to retain the tool. A release collar mounted around the cage has a cam surface to force the balls inwardly to retain the tool. The release collar is moveable against a spring bias to allow the balls to move radially outwardly to release the tool.

Another feature is that the bearing which supports the cage is retained by a ring threaded into the feed collar in the annular space between the collar and cage. The release collar and ring have cooperating coupling means enabling the ring to be threaded in or out by means of the release collar.

A further feature is the provision of a removable spacer to prevent inadvertent engagement of the ring by the release collar.

Another feature is that the release collar must be moved away from the power tool housing to release the cutting tool. This prevents release due to chip build up.

CROSS REFERENCES TO RELATED APPLICATIONS

Various features described herein are claimed in separate applications. The hole cutter with magnetic base is claimed in application Ser. No. 720,899 now U.S. Pat. No. 4,639,170. The coolant dispensing mechanism is claimed in application Ser. No. 720,861 now U.S. Pat. No. 4,664,565. The details of the interlocking switch and magnetic base operation are claimed in application Ser. No. 720,860. The structure enabling mounting the tool feed handle on either side of the machine is claimed in application Ser. No. 720,858 now U.S. Pat. No. 4,610,580.

BRIEF DESCRIPTION OF THE DRAWINGS

FIG. 1 is a side elevation with part of the housing and coolant reservoir broken away.

FIG. 2 is an enlarged detailed section showing the magnetic base structure with the magnetic fields reinforcing.

FIG. 3 is similar to FIG. 2 but the magnetic fields cancel in this view.

FIG. 4 is a vertical section through FIG. 2 along the switch rod.

FIG. 7 is an end elevation showing the feed handle and cutter.

FIG. 10 is a horizontal section showing the tool feed details.

FIG. 11 is a section through the coolant pump and feed.

FIG. 12 is a section on line 12—12 in FIG. 11.

FIG. 13 is similar to FIG. 8, but shows the tool release collar pulled down to release the tool.

FIG. 14 is an enlarged detail showing the limit of movement of the spanner-like tips towards the retaining ring when the O-ring spacer is in place.

FIG. 15 is similar to FIGS. 8 and 13 but shows how the release collar can engage the ring when the O-ring spacer is removed.

FIG. 16 is similar to FIG. 14 but shows the spanner tips engaging the ring as in FIG. 15.

FIG. 17 is a section on line 17—17 in FIG. 13.

DETAILED DESCRIPTION OF THE DRAWINGS

Figure 8:
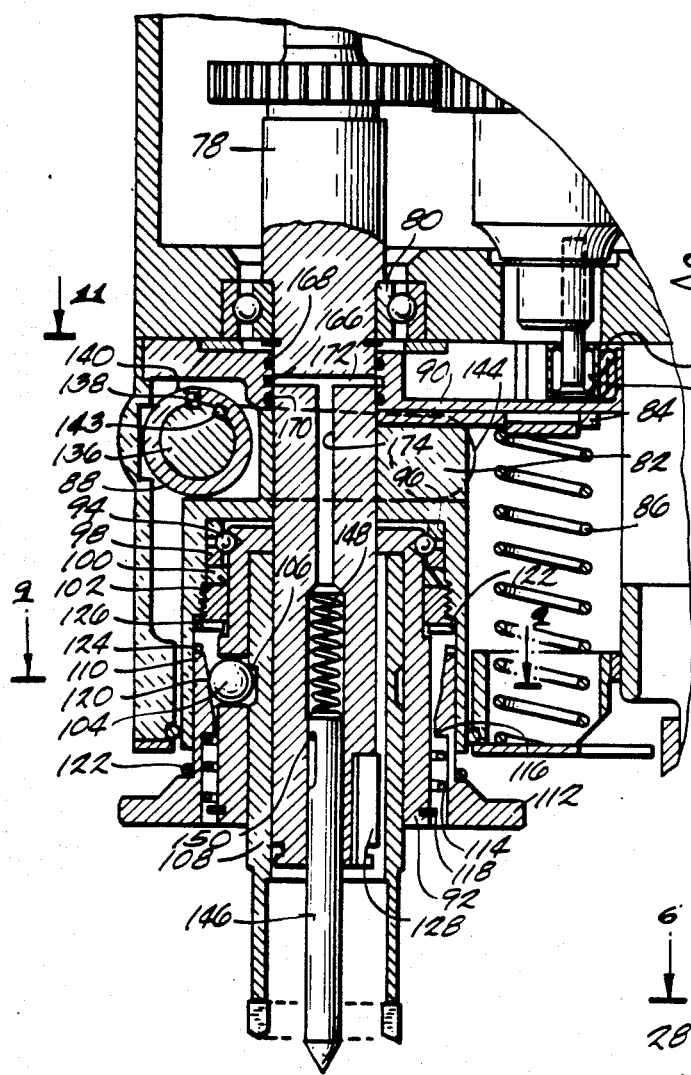
FIG. 8 is an enlarged section through the hole cutting tool, the feed assembly and the drive spindle.
Figure 5:
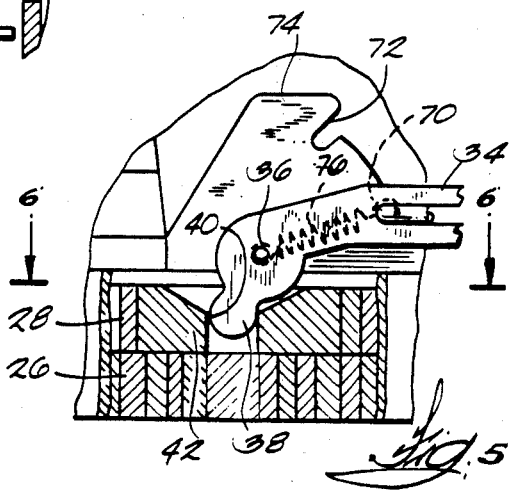
FIG. 5 is a detailed section showing how the lever/handle actuates the upper magnet assembly.
Figure 9:
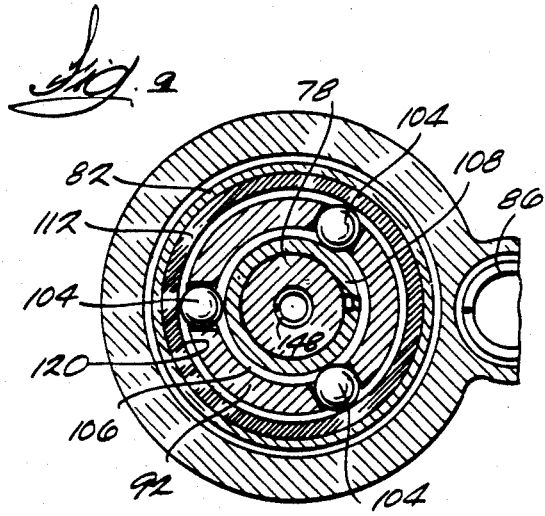
FIG. 9 is a section on line 9—9 in FIG. 8.
Figure 6:
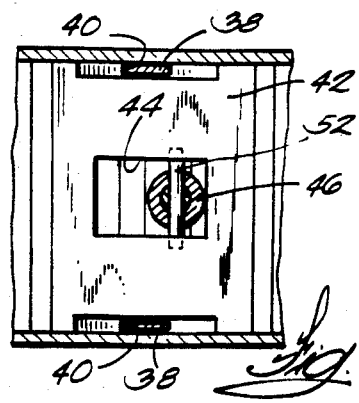
FIG. 6 is a section on line 6—6 in FIG. 5.

The portable hole cutting tool 10 includes a motor housing 12 mounted on a magnetic base 14 with a coolant reservoir 16 secured to the base behind the housing 12. The magnetic base has two permanent magnet assemblies 26, 28 with one (28) mounted on top of and movable relative to the bottom assembly 26. As seen in cross section, the thin parts 18 are the permanent magnets while the thick plates 20 are the ferromagnetic material, i.e., steel. The magnets are magnetized so that confronting faces of the magnets have similar polarities as indicated in the drawings. The alternating magnets and steel pieces in the lower assembly 26 are tied together by tie rods 22 running the lengtn of the assembly and through the ends 24 of the base 14. The upper assembly is tied by rods 23. The tie rods 22,23 straddle the sensor structure 46 to be described. When the upper magnetic assembly 28 is positioned as shown in FIG. 2, the upper magnets are aligned with the lower magnets of similar polarity. Thus, the steel pieces between the upper and lower magnets are alternately North and South and this will set up a magnetic field attracting the base of the tool to ferromagnetic material contacting the base. The upper magnet assembly is slightly shorter than the lower magnet assembly so there is always some flux effective even when the upper magnetic assembly is shifted to the right by a distance adequate to align the upper magnets with lower magnets of opposite polarization as shown in FIG. 3 and the fields of the upper and lower assemblies substantially shunt each other leaving only a small net force holding the tool on the work surface. This improves handling characteristics of the tool.

Shifting the upper magnetic assembly 28 relative to the lower assembly 26 is controlled by handle 30 which has a hand grip 32 at the distal end of the crank arms 34 straddling the reservoir 16 and pivoted on shaft 36 fixed in the rails 27 of the base extrusion 25. The short leg 38 of each crank 34 is received in a slot 40 of a non-magnetic (aluminum) actuating block 42. The actuating block has an elongted central opening 44 through which the sensing probe 46 and switch rod 48 extend. The elongated opening 44 permits the upper magnetic assembly 28 to shift relative to the lower magnetic assembly 26 and relative to the sensor 46 and rod 48.

The non-magnetic aluminum block 42 is provided with a transverse groove 50 on the underside permitting cross pin 52 mounted transversely in the switch rod 48 to come up into the groove 50 when the magnetic assembly is active (as shown in FIG. 2). If the upper magnetic assembly 28 has been shifted to the right (FIG. 3), the groove is shifted and cannot receive pin 52 and switch rod 48 cannot be raised to its upper position to close switch 54 which is a toggle switch having its actuating handle 56 received in hole 58 in the switch rod. Thus, it will be appreciated the upper magnetic assembly 28 must be in the active position (FIG. 2) to permit the switch 54 to be closed to turn on the motor in housing 12.

It will be noted the sensor 46 is reciprocally mounted on the lower end of the switch rod 48 with the transverse rod or stop 52 extending through the hole 60 in the sensor. Thus, the sensor can move relative to the cross pin 52 within the limited range of movement permitted by the stop pin 52 engaging opening 60. The sensor is biased downwardly by spring 62 compressed between the upper end of the sensor 46 and the pin 36 extending through slot 64 in the switch rod 48. It will be appreciated that in the position shown in FIG. 2 the sensor has been pushed upwardly by reason of engagement with a flat surface. This enables the switch rod 48 to be raised, as illustrated, to close the switch 54. If the tool is knocked over or the like so the sensor is no longer pushed into the base by reason of contact with a work surface, the spring 62 will force the sensor downwardly out of the base and that will cause the aperture 60 to pull stop 52 down and pull the switch rod 48 down to actuate the bat switch handle 56 to turn off switch 54 and deenergize the motor.

When the magnetic assembly is positioned as shown in FIG. 2 and the sensor is retracted, the motor can be energized by lifting the knob 49 on the switch rod 48. The knob 49 is depressed to turn the motor off. The upper magnetic assembly is actuated by actuating lever 30. The lever is locked in either the magnet energized (FIG. 2) or the magnet deenergized position (FIG. 3) by a latch arrangement which includes the U-shaped latch member 66. The cross leg of the U extends through the slots in the crank arms 34 and the open ends are turned in at 68 to engage either the "on" slot 70 or the "off" slot 72 in the side plate 74. The in-turned ends 68 are biased into engagement with either of the slots by a tension spring 76. When it is desired to go from the "on" to "off" or from "off" to "on" mode, the cross piece 66 of the latch is pulled rearwardly to disengage the ends 68 from the slot and permit the lever to be actuated. When the cross piece 66 is released, spring 76 will pull the latch ends 68 back into the appropriate slot.

The motor in housing 12 drives spindle 78 (FIG. 8) rotatably mounted in bearing 80 and an upper bearing (not shown). The spindle is not movable axially. A feed collar 82 is mounted on the spindle for axial movement relative thereto. The collar has a rearwardly extending plate 84 fixed thereto with compressed spring 86 biasing the plate and collar upwardly to its upper limit of travel as determined by engagement of the collar with sleeve 88 and/or plate 90.

Collar 82 has a cutter retaining cage 92 rotatably mounted therein. The upper end of the cage 92 is provided with a race for ball bearings 94. The collar is provided with upper and lower races 96, 98 engaging the balls 94 to take a load in either direction. The lower race is biased upwardly by the O-ring 100 compressed by the ring 102 threaded into the collar 82.

The cage 92 has three cross bores receiving retaining balls 104 which engage the groove 106 in the tubular body of the cutter 108. These balls are held in engagement by the cam 110 in the upper inside of release collar 112 which is biased upwardly by spring 114 compressed between the inside flange 116 of the release collar and the snap ring 118 fixed in the lower end of the cage. It will be noted the cam 110 actually has a cylindrical section 120 which engages the balls when they are in operative position engaging the cutter groove. This flat on the ramp prevents any force build-up from feeding back to the ramp and moving the ramp to disengage the balls and thus the lose grip on the cutter.

The release collar 112 is pulled down against the bias of spring 114 to pull the cam 110 down to release the retaining balls 104 (as shown in FIG. 13) for radial movement outwardly. This releases the tool. Pulling the release collar down is not as convenient as pushing it up to release but it was found chips building up could push the release collar up and release the tool. Therefore, the pull-down-to-release is preferred. When the cutting tool is removed the balls are still captured by the cage 92 on a greater diameter than the thickness of the tool sleeve/shank.

Means are provided for turning the threaded ring 102 into the seemingly inaccessible spot inside the feed collar 82. When the cutter 108 is removed, the release collar 112 can be pushed upwardly towards the ring, but, as shown in FIG. 14, cannot quite reach the ring because of the O-ring 122 which functions as a spacer preventing the tangs 124 on the upper end of the release collar from engaging the slots 126 on the lower edge of the compression ring 102. When it is desired to turn the ring, the O-ring 122 is removed as in FIG. 15 to permit the release collar to be moved up far enough for tangs 124 to engage slots 126 in the ring and act as a spanner for turning the ring. Details of this range of movement are shown in FIG. 16. After ring 102 has been turned in enough to compress the O-ring 100 to load the lower race 98, the spacer O-ring 122 is remounted as shown. The cutting tool has an internal groove receiving drive key 128 fixed on the spindle 78. The key drives the cutter. Downward movement of the feed collar 82 (and the cutter) is regulated by the lever 130 threaded into lever collar 132 with drive pin 134 (FIG. 10) captured with its ends received in the lever 130 and in the cross shaft 136. The cross shaft can project from either side of the housing while being limited in its transverse movement relative to the housing by the limit pin 138 threaded through sleeve 140 into the groove 142 in the cross shaft. The cross shaft 136 is keyed to the sleeve 140 by key 143 which has a press fit in the keyway in sleeve 140.

The sleeve 140 is part of the forked actuating mechanism for the collar 82. Thus, the two arms 144 of the actuating cam straddle the spindle and upper portion of the collar to engage the collar (FIG. 10) so that when the lever 130 is moved clockwise (FIG. 1) the ends of the cams 144 press down on the collar 82 in opposition to spring 86 to move the collar downwardly. This moves the cutter and the retention cage downwardly to feed the cutter into the material to be worked on.

The center of the hole to be cut is indicated by the depending, spring loaded center or probe 146 projecting from the lower end of the spindle. The probe 146 is biased downwardly by spring 148 compressed between the internal shoulder in the center bore of the spindle and the upper end of the center and can move upwardly against the bias of the spring 148 as the tool is positioned on the work so that the probe retracts as the cutter feeds through the work. The probe can't get any further out of the spindle than the position illustrated by reason of the limit stop 150 fixed in the spindle engaging the end of the groove on the side of the probe. The probe acts as a slug ejector as the cutter is retracted from the work.

Coolant is supplied to the inside of the cutter from the reservoir 16 through a plastic hose 152 mounted therein and extending to the lower right corner (FIG. 2) so that if the machine is mounted in a vertical position the end of the tube will be at the low point of the reservoir. The plastic tube extends up inside the housing past a rotary cam 154 mounted in the housing with an actuating end on the outside of the housing. Cam 154 squeezes the tube 152 through the metal wear plate 156 to avoid cutting or wearing out the tube. Cam 154 can be rotated to pinch off the tube as desired to regulate the amount of coolant flow to the cutting tool. Thus the cam functions as a slow control. The tube then passes between a resilient post 158 carried on the actuating plate 84 and a fixed overhead part 160 of the housing so that when the cutter is in its uppermost position, i.e., not working, the tube 152 is pinched off. When the feed lever 130 is actuated, the resilient pad 158 is pulled away from the tube 152 and flow of coolant can occur. The coolant pump is a peristaltic pump which includes the curved portion 161 against which the tube 152 is squeezed by eccentric cam or roller 162 to effect the peristaltic pumping action. The end of the tube 152 is connected at 164 to manifold 166 (FIG. 8) between the upper and lower O-rings 168, 170 to communicate with the cross bore 172 in the spindle to feed coolant to the axial bore 174 in the spindle and down through a recess in the probe 146 to the inside of the cutting tool. With this arrangement, no coolant flows until the cutter is moved from its upper position. The structure permits the flow rate to be adjusted to the requirements prior to starting the cutting operation.

I claim:

1. A power tool having a frame, an axially fixed spindle rotatably mounted in the frame,
    a tool feeder collar non-rotatably mounted in said frame coaxial with and outside said spindle, said collar being movable axially with respect to said spindle,
    a cage inside said collar and radially spaced from said spindle,
    thrust bearing means supporting said cage inside said collar for rotation relative to said collar and for axial movement with said collar,
    said bearing means including an inner race on said cage and an outer race inside said collar,
    a ring threaded inside said collar under said outer race to mount the outer race in the collar,
    a tubular tool shank in the radial space between said cage and said spindle,
    a drive key connecting said spindle and said tool shank while accommodating axial movement of said tool relative to said spindle, and
    means releasably fixing said tool shank to said cage.

* * * * *